Patented Feb. 11, 1936

2,030,214

UNITED STATES PATENT OFFICE 2,030,214

AZO DYES AND METHODS FOR THEIR PREPARATION

Arthur Howard Knight, Ashton-on-Mersey, England, assignor to Imperial Chemical Industries Limited, a corporation of Great Britain No Drawing. Application September 21, 1932, Serial No. 634,199. In Great Britain September 30, 1931

13 Claims. (Cl. 260—81)

This invention relates to new azo dyes and more particularly refers to disazo dyes which are especially valuable for dyeing acetyl silks in colors ranging from blue to violet.

Azo dyes have, in the past, been produced by coupling a diazotized nitro-amine of the benzene or naphthalene series with an unsulfonated amine, diazotizing the resulting amino-azo compound and coupling it with an amine of the benzene series. These dyes have, in general, produced brown colors which were well adapted for dyeing acetyl cellulose. However, such combinations were never known to produce blue to violet colors. In fact very few blue to violet azo dyes having an affinity for acetyl cellulose are known.

It is an object of the present invention to produce azo dyes ranging in color from blue to violet and having exceptional affinity for acetyl silks. A further object is to produce azo dyes having excellent fastness to washing and light. Additional objects will appear hereinafter.

These objects are accomplished by the present invention wherein a diazotized nitro-amine of the benzene or naphthalene series is coupled with a dialkoxy aniline, the resulting amino-azo compound being diazotized and coupled with an amino compound of the benzene or naphthalene series. These components may have groups substituted thereon other than hydroxy, sulfonic acid, and carboxylic acid groups, without impairing the advantages of the resulting products.

The invention may be more readily understood by reference to the following illustrative examples.

Example 1

138 parts of p-nitro-aniline were diazotized in the usual way and added to a solution of 153 parts of 2-5-dimethoxy-aniline in 370 parts of 10% hydrochloric acid and 6000 parts of water. When the combination was complete about 18,000 parts of water were added. The so-diluted suspension of mono-azo compound was heated to 50-60° C. 76 parts of sodium nitrite were then added, the mixture being stirred until diazotization was complete, the diazo-azo compound passing into solution. This solution was filtered if necessary and cooled to 20° C. It was then added to a solution of 108 parts of m-phenylene-diamine in 8000 parts of water.

The mixture was stirred until combination was complete and the dyestuff which was out of solution was filtered off, washed with water and preserved as a paste. It gave navy blue shades on cellulose acetate. If alpha-naphthylamine is used in place of m-phenylene-diamine in this combination the resulting dyestuff gives a somewhat redder shade.

The dyestuff paste containing one part of the dyestuff prepared according to Example 1 was added to the dye bath containing a very small amount (about 1/100th part) of the substance obtained by condensing naphthalene sulfonic acid with formaldehyde (cf. Example 1 of British Patent No. 224,077) and to the lukewarm dye bath was then added 100 lbs. of cellulose acetate yarn. The temperature was raised to 80° C. during half an hour and the material was dyed for a further half an hour at this temperature. It was then washed and dried in the usual way, giving a navy blue dyeing.

Example 2

138 parts of o-nitro-aniline were diazotized in the usual way and coupled with 2-5-dimethoxy-aniline as described in Example 1. When the combination was complete about 18,000 parts of water were added and the mono-azo suspension heated to 50° C. 76 parts of sodium nitrite were then added. The mixture was stirred until diazotization was complete, the diazo-azo compound passing into solution. The solution was filtered, if necessary, and after cooling to 20° C. was added to a solution of 142.5 parts of 4-chloro-m-phenylene-diamine in 8000 parts of water and 370 parts of 10% hydrochloric acid. The mixture was stirred until combination was complete when the dyestuff, which was out of solution, was filtered off, washed with water, and preserved as paste. It dyed cellulose acetate in greenish-blue shades when applied in the manner described in Example 1.

Example 3

172.5 parts of p-chloro-o-nitro-aniline were diazotized in the customary manner and added to a solution of 153 parts of 2-5-dimethoxy-aniline in 370 parts of 10% hydrochloric acid and 8000 parts of water. When the combination was complete about 18,000 parts of water were added.

The so-diluted suspension of mono-azo compound was then treated with sufficient 40% caustic soda solution to remove the mineral acidity after which 962 parts of 10% hydrochloric acid were added. The suspension was then heated to 50-55° C. and 82 parts of sodium nitrite added. The mixture was stirred until diazotization was complete, the diazo-azo compound passing into solution. This solution was filtered, if necessary, and cooled to 20° C. It was then added to a solution of 142.5 parts of 4-chloro-m-phenylene-diamine in 8000 parts of water and 370 parts of 10% hydrochloric acid. The mixture was stirred until combination was complete, when the dyestuff, which was out of solution, was filtered off, washed with water, and preserved as a paste. It dyed cellulose acetate in violet shades when applied in the manner described in Example 1.

*Example 4*

138 parts of diazotized p-nitro-aniline were coupled with 153 parts of 2-5-dimethoxy-aniline and the resulting mono-azo compound diazotized according to the method described in Example 1 above. The solution of the diazo-azo compound, cooled to 20° C., was then added to a solution of 136 parts of m-amino-dimethyl-aniline in 12,000 parts of water and 370 parts of 10% hydrochloric acid. Combination was completed by neutralizing the mineral acid with sodium acetate and the dyestuff filtered off, washed with water, and preserved as a paste. It dyed cellulose acetate in navy blue shades when applied in the manner described in Example 1.

It is to be understood that numerous compounds in addition to those mentioned in the previous examples may be used in carrying out the process of the present invention. For instance, as a first component nitro-amino derivatives of the benzene or naphthalene series which do not have hydroxy, sulfonic acid or carboxylic acid groups substituted thereon may be used. As examples of these compounds may be mentioned ortho-chloro-para-nitro-aniline and 2-4-dinitro-aniline, as well as the analogous derivatives of the naphthalene series.

The second component is a dialkoxy aniline which should not contain hydroxy, sulfonic acid or carboxylic acid groups. The dialkoxy groups may be the same or they may be dissimilar without impairing the properties of the resulting products. They may occupy other positions on the nucleus than the 2,5 position, as long as they do not prevent coupling from taking place. Obviously this second component must not only be capable of coupling with the first component but it must also be capable of diazotization.

Amines of the benzene or naphthalene series and their derivatives, free from hydroxy, sulfonic acid and carboxylic acid groups, are used as third components. These amines may be substituted or unsubstituted, and the substituent groups may be introduced into the amino group as well as the benzene or naphthalene nucleus. Representative examples of compounds falling within this definition are meta-toluylene-diamine, alpha-naphthylamine, and ethyl-alpha-naphthylamine.

The conditions under which this process is carried out may be varied within rather wide limits without departing from the scope of the present invention. In diazotizing the amino-azo compounds somewhat better results may be obtained by elevating the temperature, the range from 50–60° C. being preferred. However, it is not intended that this be construed as a limitation since much lower temperatures may be used without departing from the scope of the invention.

The products described herein quite unexpectedly impart desirable blue to violet shades to acetyl silks, instead of the customary brown shades. These shades are exceptionally fast to light and washing and are a valuable addition to the meager selection of blue azo dyes now available for acetyl silk. They may be used in the form of a dye or a printing paste and have many uses in addition to the dyeing of acetyl silks.

As many apparently widely different embodiments of this invention may be made without departing from the spirit and scope thereof, it is to be understood that I do not limit myself to the specific embodiments thereof except as defined in the appended claims.

I claim:

1. A process for producing azo dyes which comprises coupling a diazotized compound of the class consisting of nitro-aniline and nitro-naphthyl-amine, which may have substituted thereon members selected from the class consisting of halogen and nitro groups, with a dialkoxy-aniline, diazotizing the resulting amino-azo compound and coupling it with one of a group of compounds consisting of an amino-benzene and naphthylamine which may have substituted thereon members selected from the class consisting of halogen, alkyl, amino and dialkylamino groups.

2. A process for producing azo dyes which comprises coupling a diazotized nitro-aniline which may have substituted thereon members selected from the class consisting of halogen and nitro groups, with 2-5-dialkoxy-aniline, diazotizing the resulting amino-azo compound and coupling it with an amino-benzene which may have substituted thereon members selected from the class consisting of halogen, alkyl, amino and dialkylamino groups.

3. A process for producing azo dyes which comprises coupling a diazotized amino-azo compound having the following general formula:

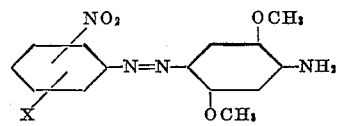

in which X represents hydrogen or chlorine, with a member selected from the group consisting of m-phenylene-diamine, 4-chloro-m-phenylene-diamine and m-amino-dimethyl-aniline.

4. A process for producing an azo dye which comprises coupling diazotized p-nitro-aniline with 2,5-dimethoxy-aniline, diazotizing the resulting amino-azo compound and coupling it with m-phenylene-diamine.

5. A process for producing an azo dye which comprises coupling diazotized o-nitro-aniline with 2,5-dimethoxy-aniline, diazotizing the resulting amino-azo compound and coupling it with 4-chloro-m-phenylene-diamine.

6. A process for producing an azo dye which comprises coupling diazotized p-chloro-o-nitro-aniline with 2,5-dimethoxy-aniline, diazotizing the resulting amino-azo compound and coupling it with 4-chloro-m-phenylene-diamine.

7. Azo dyes having the following general formula:

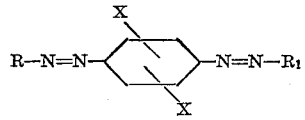

wherein R represents a nitro-aniline or nitro-naphthylamine radical, which may have substituted thereon members selected from the class consisting of halogen and nitro groups, X represents an alkoxy group, and $R_1$ represents an amino-benzene or amino-naphthalene radical which may have substituted thereon members selected from the class consisting of halogen, alkyl, amino and dialkyl-amino groups.

8. Azo dyes having the following general formula:

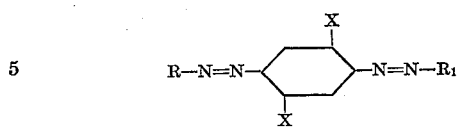

wherein R represents a nitro-aniline radical, which may have substituted thereon members selected from the class consisting of halogen and nitro groups, X represents an alkoxy group, and $R_1$ represents an amino-benzene radical which may have substituted thereon members selected from the class consisting of halogen, alkyl, amino and dialkyl-amino groups.

9. Azo dyes having the following general formula:

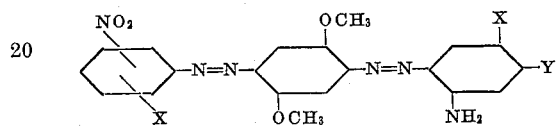

wherein X represents hydrogen or chlorine, and Y represents an amino or dialkyl-amino group.

10. An azo dye having the following formula:

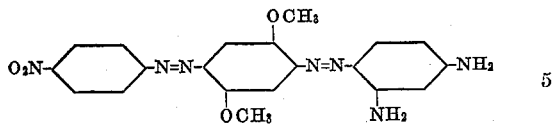

11. An azo dye having the following formula:

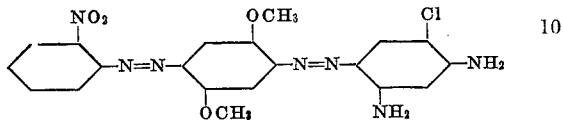

12. An azo dye having the following formula:

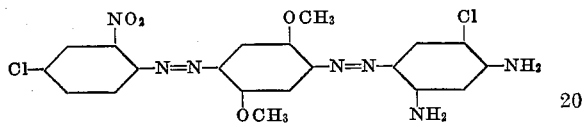

13. The products of claim 7 wherein $R_1$ represents an azo coupling component of the diamino benzene class.

ARTHUR HOWARD KNIGHT.